June 4, 1974     A. E. ANDERSON     3,814,644
PROCESSING OF EXPANDED-PLASTIC SHEET MATERIAL
Filed Sept. 16, 1971
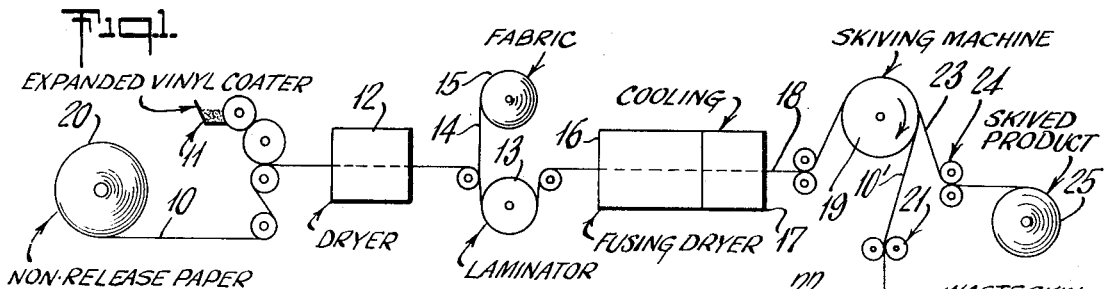
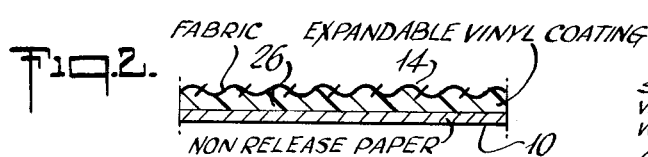
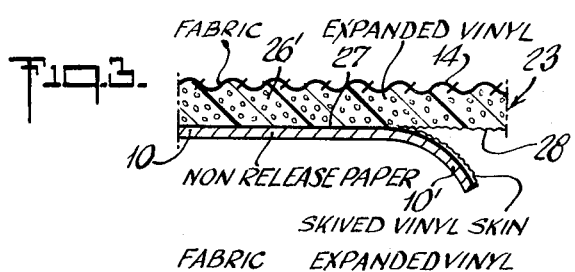
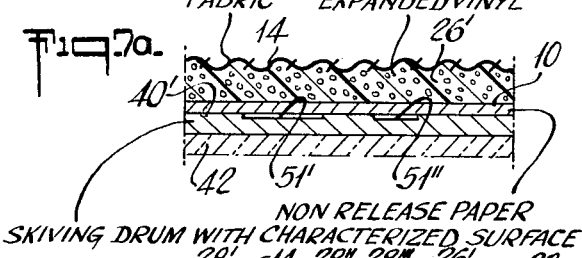
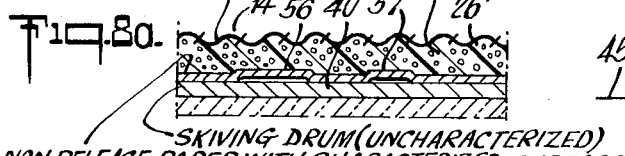
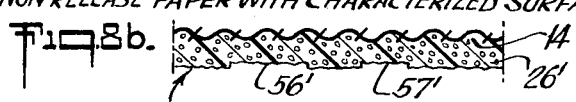
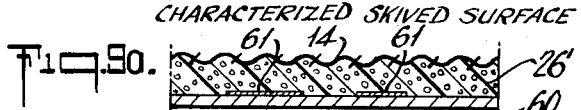
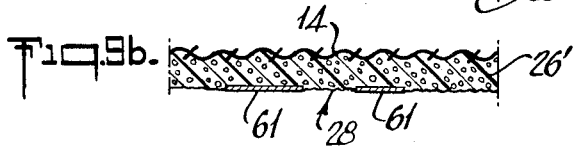
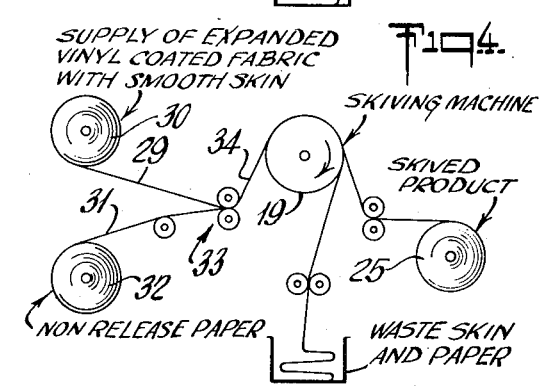
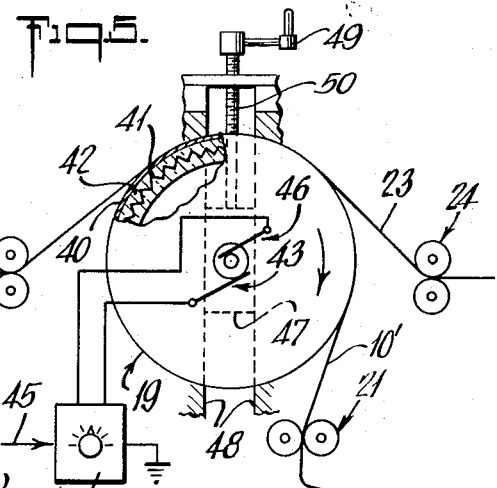
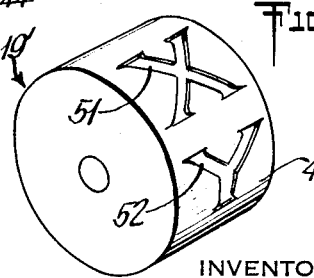
INVENTOR
ALBERT E. ANDERSON
BY Sandoe, Hopgood & Calimafde
ATTORNEYS

United States Patent Office 3,814,644
Patented June 4, 1974

3,814,644
PROCESSING OF EXPANDED-PLASTIC
SHEET MATERIAL
Albert E. Anderson, Norwich, Conn., assignor to Pervel
Industries, Inc., Plainfield, Conn.
Filed Sept. 16, 1971, Ser. No. 181,113
Int. Cl. B32b 31/18
U.S. Cl. 156—78         16 Claims

ABSTRACT OF THE DISCLOSURE

The invention contemplates processing of expanded-plastic sheet material to produce a velvet-like texture on one face, by an improved technique of heat-skiving. In one embodiment, the expanded-sheet material is initially cast upon a non-release sheet, as of paper, and after the expanded-plastic has been cured, the non-release sheet is pulled from the main body of the expanded-plastic material, removing the skin layer of the expanded sheet with the removed non-release sheet, and thereby exposing a velvet-like surface on the remaining expanded-plastic material; loss of expanded plastic is minimized by careful control of a thermal gradient through the thickness of the plastic to assure local weakening at a stratum of expanded material adjacent the bond to the non-release sheet. In another embodiment, expanded plastic sheeting, taken from inventory, is laminated with non-release sheeting, so that the skin of the inventoried material can be removed by the same "heat-skiving" technique.

This invention relates to the processing of expanded-plastic sheet material, such as fabric-reinforced vinyl sheet, to produce a velvet or suede-like finish on the outer surface. The invention represents an improvement over the heat-skiving technique described in my copending application, Ser. No. 721,002, filed Apr. 12, 1968 now U.S. Pat. No. 3,607,493 issued Sept. 12, 1971.

Said application discloses in detail a process and apparatus for continuously removing the smooth outer skin of expanded-plastic sheet material. The technique is to apply the said outer-skin side of the material to a heated drum, under suitably controlled conditions of exposure time, heat level, etc. to assure (a) local weakening of the plastic at a stratum immediately adjacent the outer skin and (b) a temporary tacky affinity of the outer skin for the drum surface. The body of expanded material is continuously pulled away from the drum, leaving the skin on the drum for doctor-blade scavenging. A velvety texture characterizes the resulting outer face of the expanded-plastic sheet.

While the indicated technique produces a fine product, the heat-skiving drum must be monitored for cleanliness, and the temperature-control and other requirements are unduly critical and limiting.

It is, accordingly, an object of the invention to provide an improved method and apparatus for producing a velvet-like face on expanded-plastic material.

Another object is to achieve the foregoing object with a technique that is flexibly and selectively adaptable to (a) direct continuous production of the velvet-texture material and (b) to applying such a finish to stock expanded-plastic sheet material, as may be taken from inventory.

It is a specific object to avoid any need for a doctor-blade or for any other cleaning means in performing a heat-skiving operation of the character indicated.

Another specific object is to provide a heat-skiving technique which lends itself to the automatic creation of predetermined surface-design effects in the velvety surface.

Other objects and various further features of novelty and invention will be pointed out or will occur to those skilled in the art from a reading of the following specification, in conjunction with the accompanying drawings. In said drawings, which show, for illustrative purposes only, preferred embodiments of the invention:

FIG. 1 is a simplified diagram to illustrate steps in performing one embodiment of the method of the invention;

FIGS. 2 and 3 are similar enlarged fragmentary sectional views through web material undergoing the process of FIG. 1, to illustrate various stages of web processing;

FIG. 4 is a view similar to FIG. 1 to illustrate another embodiment;

FIG. 5 is a simplified view in side elevation of heat-skiving apparatus in FIGS. 1 and 4;

FIG. 6 is a simplified perspective view of a heat-skiving drum, modified from that of FIG. 5;

FIGS. 7a and 7b are views similar to FIGS. 2 and 3 to illustrate different stages of a process using a heat-skiving drum as in FIG. 6; and FIGS. 8a and 8b, and 9a and 9b, respectively, are views corresponding to FIGS. 7a and 7b to illustrate further embodiments.

The invention will be described in the context of processing fabric-backed expanded-vinyl sheet material as described in detail in said patent application. Generally, and with reference to FIG. 1, the method involves casting expandable vinyl material upon a base sheet 10, using suitable coating means 11. The coated sheet is passed through a preliminary dryer 12 where initial expansion occurs, prior to laminating at 13 with a continuous web of fabric 14, from suitable supply means 15. Plastic expansion then continues to completion, with the fabric 14 embedded in the expanding upper face, and a fusing dryer 16 and cooling means 17 serve to cure the plastic and its bond to the fabric, as well as to deliver at 18 a product that is sufficiently cooled for heat skiving, at drum 19.

In the method of said application, the base sheet 10 is a release paper or is otherwise suitably prepared to release freely from the cast expanded plastic sheet, in the region 18, reliance being placed upon doctor-blade means at the skiving drum 19, to remove the skin of plastic which characterizes the surface exposed after separating the release sheet. According to the present invention, however, the base or casting sheet 10 is non-release in nature, for example, a paper to which expandable liquid plastic applied at 11 will readily bond or adhere; for purposes of the present description, the term "non-release paper" will be understood to describe such material, continuously available from a supply 20. In using such a supply 20 of non-release material, the base 10 will be understood to be firmly bonded to the underside of the cured expanded web, as it issues at 18 from processing means 16–17.

Heat-skiving, according to the invention, then takes place (a) by transiently applying heat from drum 19 to the base (10) side of the expanded-plastic web, thereby creating a heat gradient in the expanded plastic at a stratum near the base 10, and (b) by then stripping the base 10 (and the plastic skin bonded thereto) from the remaining body of the expanded-plastic material. As shown, the severed base (with stripped plastic skin) is identified 10' and is picked off drum 19 by suitable feed means 21, to a waste-collection device 22. The remaining and primary body of fabric-reinforced expanded-plastic web is identified 23, being picked off drum 19 by feed means 24, to a take-up reel or other product-handling device 25.

FIGS. 2 and 3 provide a more detailed inspection of the developing product. In FIG. 2, the depicted situation is representative, at entry to the dryer 16, the expandable plastic 26 being in the course of expansion, with fabric 14 laminated to the upper or back surface, and with the non-release paper base 10 laminated to the opposite side of the plastic. In FIG. 3, the plastic (designated 26') has fully expanded and is cured. Upon entry to the skiving apparatus 19, the relationship is as depicted in the left half of FIG. 3, wherein the skin 27 of the plastic is firmly bonded to the non-release paper 10. The indicated heat gradient in the stratum of expanded plastic adjacent paper 10 (and skin 27) is such as to locally weaken the structure, to an extent favoring a uniform tear at this stratum. The right-hand half of FIG. 3 will be understood to illustrate the stripping action wherein paper with bonded plastic skin (designated 10') is severed from the remaining body of fabric-reinforced expanded plastic. The resulting face 28 is of soft velvet-like texture, for which fineness of grain is a function of the particular expandable plastic, as well as of the sharpness with which the indicated temperature gradient is established at the stripping stratum. Viewed from another aspect, the extent to which it is possible to maintain relatively cool temperature conditions in the fabric-reinforced web-body side of the stratum, as compared with relatively heated conditions to and on the paper-bonded other side of the stratum, will determine utmost conservation of expanded-plastic body in the ultimate product, with attendant minimal loss of plastic in the course of stripping (skiving).

In the embodiment of FIG. 4, the described skiving operation is performed on stock material 29, available from a supply 30. The stock material may, for example, be a roll of fabric-reinforced expanded-vinyl material, made as described in said application, by casting on a release paper. The stock material will thus be understood to have a fabric-bonded back and a smooth skin of plastic on its opposite side or face. In FIG. 4, a non-release base or paper 31, from a supply 32, is laminated to the skin or face side of the material 29. Pinching feed rolls 33 will be understood to schematically indicate the means (heat, pressure, etc.) needed to accomplish such lamination, depending on the particular materials involved. The net result is to produce at 34 an intermediate product as described at 18 in FIG. 1, and therefore appropriate for handling by the skiving technique already described. The same reference numbers are therefore repeated in FIG. 4, for skiving at 19, to yield a skived product at 25, with waste collection at 22.

FIG. 5 provides illustrative detail for the skiving apparatus. The drum 19 is seen to comprise an outer cylindrical shell 40, which may be of sheet metal, backed by electrical heating means 41 in a suitable refractory supporting body 42. Heating means 41 is supplied via slip-ring means 43, connected in turn to a control device 44, operating from a supply 45, and having means for manual selection of temperature at shell 40; the slip-ring means 46 will be understood to suggest a feed-back line whereby an electrical quantity reflecting achieved temperature at 40, as tracked by a probe (not shown), may be utilized to maintain the temperature level selected at 44.

FIG. 5 also illustrates means for selectively adjusting the exposure time (distance) of web contact with the skiving drum 19. This is achieved by mounting drum 19 for rotation in end block (suggested at 47) which are guided in vertical ways 48 and which are adjustably positionable by manual means 49 in conjunction with a lead screw 50. The greater the elevation of means 47 in ways 48, the greater the arc of web contact with drum 19.

In accordance with a further feature of the invention, the velvet-like texture of the product surface 28 may be profiled or characterized, to produce design effects, both functional and non-functional, as desired. FIGS. 6, 7a and 7b are directed to one technique for effecting such a result.

In FIG. 6, the shell 40' of a modified skiving drum 19' is characterized by surface irregularities or formations, which may be intaglio or relief, depending on desired effects in the product surface 28. As shown, the formations 51–54 are large intaglio capital letters, which may be stamped indentations in the sheet metal of surface 40'; in FIG. 7a, however, the indentations 51'–51" are seen to be merely local recesses in the outer surface of drum shell 40'. In use, and applied to the smooth exposed surface of the non-release sheet 10, the raised areas (i.e., primary cylindrical surface) of shell 40' have the most direct heat-transfer relation with sheet 10, resulting in greatest local penetration of the sharp heat-gradient stratum, whereas the recessed areas 51'–51" have an indirect heat-transfer relation with sheet 10, resulting in lesser local penetration of the heat-gradient stratum. Thus, upon stripping sheet 10 (and its bonded layer of plastic skin) from the remaining body of fabric-reinforced expanded plastic 26', the velvety surface 28 assumes a correspondingly characterized relief appearance, schematically suggested by a base level 28', from which relief formations 28"–28"' rise, in correspondence with recesses 51'–51".

The technique illustrated in FIGS. 8a and 8b produces results similar to that of FIGS. 6, 7a and 7b. In FIG. 8a, the skiving drum 19 has the smooth cylindrical exterior, described for shell 40 in FIG. 5, but the expanded plastic is cast on (or laminated to) a non-release paper 55 having embossed formation 56–57 of desired configuration. Heat applied via the skiving drum surface is caused to develop different local depths of weakened strata, corresponding to embossed vs. unembossed areas of paper 40. In FIG. 8b, it is seen that upon stripping (skiving), the velvety surface 28 assumes characterized irregularities 56'–57' corresponding to the embossments 56–57 in paper 55.

It will be seen that I have described an improved technique, leading itself to a variety of modifications, to achieve particular functional and non-functional ends. Texture, and profile characterizing of texture, are the significant controllably variable features in use of the process.

It will be also understood that the described specific applications are merely illustrative. For example, for certain purposes, skiving may be acceptably achieved without cooling at 17 and/or without establishing a sharp temperature gradient in the web 18, the resulting product involving perhaps greater waste of plastic material and a rougher texture at 28. Also, the recesses 51'–51" in FIG. 7a may be taken to illustrate merely the use of a characterized area distribution of heat-transfer, in preparation for the severance of expanded material at the skiving stratum; thus the local voids of recesses 51'–51" may be filled with a material (e.g., a plastic filler) of less heat conductivity than the metal of shell 40', thereby allowing the filled shell 40' to be smoothly cylindrical throughout, for continuous direct contact with the paper 10, reliance being had on the locally characterized differences in heat-transfer capability, to achieve a correspondingly characterized "velvet" surface 28.

Further, as illustrated in FIGS. 9a and 9b, the surface of the non-release paper 60 may be locally characterized with a release coating, as at 61 by a printing technique, so that upon skiving at 19, the resulting product has a skived (velvety) background 28 and a shiny "printed" design outline 61', for the printed regions at which the release material was applied.

What is claimed is:

1. The method of continuously making an elongated fabric-reinforced plastic strip, which comprises continuously applying liquid expandable plastic to a continuously moving sheet having non-release properties, thereby establishing an expanding-plastic surface on one side of the sheet, continuously laminating a fabric to said surface at a region in which the expanding plastic is sufficiently viscous to permeate interstices of the fabric and substantially prior to completed expansion of the plastic, awaiting a sufficient time for the plastic to substantially expand, curing the expanded plastic, whereby a laminate is produced with a first or back portion of the plastic bonded to the fabric and a second or skin portion of the plastic bonded to the sheet and with a body of expanded material therebetween, locally and transiently heating the sheet, whereby heat-transfer from the sheet to and through the adjacent skin portion of the plastic locally weakens the expanded-body region at a depth location adjacent said skin portion, and stripping at the locally weakened region the sheet and its adjacent bonded plastic from the fabric and its adjacent bonded plastic, thereby exposing as the front of the strip a relatively thick velvet-like surface which results from tearing the cured plastic at a stratum close to said skin portion and significantly characterized by voids created upon plastic expansion.

2. The method of claim 1, in which the laminate is cooled prior to the local and transient application of heat to the sheet whereby an enhanced thermal gradient defines the stratum at which the expanded plastic is locally weakened, so that plastic removed with the sheet is kept at a minimum, thus assuring maximum retained body of expanded plastic in the fabric-reinforced strip.

3. The method of claim 2, in which the expandable plastic includes a polyvinylchloride.

4. The method of claim 2, in which the transient local application of heat is characterized in its distribution over the area of application to the expanded plastic, whereby, after stripping, the exposed front surface of the strip is similarly characterized.

5. The method of claim 1, in which the non-release sheet is of paper.

6. The method of claim 1, in which the non-release sheet has a characterized surface profile to which said liquid-expandable plastic is applied, whereby, after stripping, the exposed front surface of the strip is similarly characterized.

7. The method of claim 1, in which a thermal gradient is established across the thickness of the expandable plastic, said gradient being characterized by predominantly cooler temperature on the fabric side of a stratum in the expanded-body region and by predominantly warmer temperature on the non-release sheet side of the stratum, whereby stripping is favored in the zone which includes the non-release sheet.

8. The method of claim 7, in which said thermal zone is characterized by a relatively sharp rise essentially local to and immediately adjacent the non-release sheet.

9. The method of claim 1, in which the sheet having non-release properties is characterized further by a pattern of limited surface areas having release properties, whereby upon stripping, the pattern areas appear in contrast against remaining velvet-like surface areas.

10. The method of claim 9, including the step of printing said sheet with release material to produce the characterizing pattern.

11. The method of skiving an outer-skin face from the expanded-body region of a sheet of expanded plastic material, which comprises laminating to said face a sheet of non-release material, locally and transiently applying heat to the exposed surface of said non-release sheet, whereby heat-transfer from the non-release sheet to and through the adjacent skin of said face of the expanded plastic locally weakens the expanded-body region at a depth location adjacent the skin face, and stripping at the locally weakened depth location the sheet and its adjacent laminated plastic skin-face material from the expanded remainder of said sheet of expanded plastic material, thereby exposing a relatively thick velvet-like surface which results from tearing the plastic material at a stratum close to the skin-face region and significantly characterized by voids of the expanded-body region.

12. The method of claim 11, in which the last-defined step comprises continuously pulling in divergent directions (a) the non-release sheet and its adjacent plastic material on one side of said stratum and (b) the remaining body of plastic material on the other side of said stratum.

13. The method of claim 11, in which the sheet of expanded plastic material is fabric-backed, such fabric-backing being on that side of the expanded-body region which is remote from said outer-skin face.

14. The method of claim 11, in which the sheet of expanded plastic material is formed by casting expandable plastic on a release sheet, laminating a fabric to the exposed surface of the expanding plastic, allowing the plastic to expand, and stripping the release sheet prior to laminating the non-release sheet to the face exposed upon removal of the release sheet.

15. The method of claim 11, in which the sheet of non-release material is characterized by a pattern of limited surface areas having release properties, whereby, upon severing the plastic at said stratum, the pattern areas appear in contrast against remaining velvet-like surface areas.

16. The method of claim 15, including the step of printing said non-release sheet with a localized pattern of release material to produce the characterizing pattern.

References Cited
UNITED STATES PATENTS

| | | | |
|---|---|---|---|
| 2,426,257 | 8/1947 | Ziegler | 156—242 |
| 3,167,464 | 1/1965 | Cook | 156—254 |
| 3,240,855 | 3/1966 | Voelker | 156—254 |
| 3,434,861 | 3/1969 | Luc | 156—254 |
| 3,554,835 | 1/1971 | Morgan | 156—249 |
| 3,607,493 | 9/1971 | Anderson | 156—83 |
| 3,620,872 | 11/1971 | Backwell | 156—246 |
| 3,630,802 | 12/1971 | Dettling | 156—246 |

FOREIGN PATENTS

| | | | |
|---|---|---|---|
| 1,017,136 | 1/1966 | Great Britain | 156—246 |
| 1,112,718 | 5/1959 | Germany | 156—246 |

MARION McCAMISH, Primary Examiner

U.S. Cl. X.R.

156—247, 254